United States Patent
Kasai

(10) Patent No.: US 10,766,569 B2
(45) Date of Patent: Sep. 8, 2020

(54) BICYCLE CONTROL SYSTEM

(71) Applicant: SHIMANO INC., Sakai (JP)

(72) Inventor: Yoshiyuki Kasai, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/795,902

(22) Filed: Jul. 10, 2015

(65) Prior Publication Data

US 2017/0008465 A1     Jan. 12, 2017

(51) Int. Cl.
- *B62M 9/132* (2010.01)
- *B62M 9/122* (2010.01)
- *B62M 25/08* (2006.01)
- *B62M 25/00* (2006.01)

(52) U.S. Cl.
CPC ............ *B62M 9/132* (2013.01); *B62M 9/122* (2013.01); *B62M 25/08* (2013.01); *B62M 2025/006* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 5,957,213 A * | 9/1999 | Loraas | ...................... | E02F 3/96 111/101 |
| 7,584,026 B2 * | 9/2009 | Siemer | .................... | G07C 5/008 342/357.57 |
| 7,965,178 B1 * | 6/2011 | Schmuttor | ............... | G07C 9/20 340/506 |
| 9,491,788 B1 | 11/2016 | Kasai et al. | | |
| 9,623,962 B2 * | 4/2017 | Swanson | ................ | B64C 27/001 |
| 2006/0200254 A1 * | 9/2006 | Krause | ............... | G05B 19/0421 700/20 |
| 2007/0080823 A1 * | 4/2007 | Fu | ........................... | G08C 23/04 340/4.3 |

(Continued)

FOREIGN PATENT DOCUMENTS

| | | | | |
|---|---|---|---|---|
| DE | 102015100784 A1 * | 7/2015 | ............. | B62K 23/06 |
| DE | 102014204495 A1 * | 9/2015 | ............. | H04B 7/145 |

(Continued)

OTHER PUBLICATIONS

English translation of Gluck.*

*Primary Examiner* — Jean Paul Cass
(74) *Attorney, Agent, or Firm* — Mori & Ward, LLP

(57) ABSTRACT

A bicycle control system comprises a first electrical component and a second electrical component. The first electrical component comprises a first base member, a first movable member, a first actuator, and a first controller. The first movable member is movable relative to the first base member. The first actuator is configured to move the first movable member relative to the first base member. The first controller is configured to control the first actuator. The second electrical component comprises a second base member, a second movable member, a second actuator, and a second controller. The second movable member is movable relative to the second base member. The second actuator is configured to move the second movable member relative to the second base member. The second controller is configured to control the second actuator. The first controller and the second controller are configured to wirelessly communicate.

12 Claims, 9 Drawing Sheets

(56) References Cited

U.S. PATENT DOCUMENTS

| | | | |
|---|---|---|---|
| 2007/0244573 A1* | 10/2007 | McFarland | H04L 12/2838 700/20 |
| 2008/0089964 A1* | 4/2008 | Kianpour | B29C 45/82 425/150 |
| 2008/0121452 A1* | 5/2008 | Bon | B62M 11/18 180/206.4 |
| 2008/0209211 A1* | 8/2008 | Grgic | G06F 21/6236 713/166 |
| 2012/0053775 A1* | 3/2012 | Nettleton | G06Q 10/06 701/24 |
| 2012/0130576 A1* | 5/2012 | Sugiyama | B66C 1/06 701/22 |
| 2014/0102237 A1 | 4/2014 | Jordan et al. | |
| 2014/0122648 A1* | 5/2014 | Kang | H04L 67/1095 709/217 |
| 2014/0278220 A1* | 9/2014 | Yuen | A61B 5/4812 702/150 |
| 2014/0290411 A1 | 10/2014 | Kuroda | |
| 2014/0303857 A1 | 10/2014 | Takamoto et al. | |
| 2014/0358386 A1* | 12/2014 | Cracco | B62M 9/132 701/51 |
| 2014/0358387 A1* | 12/2014 | Cracco | B62M 9/122 701/51 |
| 2015/0009019 A1 | 1/2015 | Watarai et al. | |
| 2015/0067540 A1* | 3/2015 | Yang | H04L 12/1822 715/753 |
| 2015/0073656 A1* | 3/2015 | Takamoto | G06F 9/02 701/37 |
| 2015/0284049 A1* | 10/2015 | Shipman | B62K 23/06 74/473.12 |
| 2016/0159432 A1* | 6/2016 | Nishikawa | B62M 6/50 701/22 |
| 2017/0225742 A1* | 8/2017 | Hancock | B60L 50/20 |
| 2017/0327184 A1* | 11/2017 | Contello | B62M 9/06 |
| 2018/0251190 A1* | 9/2018 | Hancock | B62M 6/45 |

FOREIGN PATENT DOCUMENTS

| | | |
|---|---|---|
| DE | 10 2016 110 692 | 12/2016 |
| EP | 2808238 A1 * | 12/2014 |
| KR | 100909436 B1 * | 7/2009 |
| TW | 201420422 | 6/2014 |
| TW | 201437086 | 10/2014 |
| TW | 201438955 | 10/2014 |
| TW | 201501995 | 1/2015 |
| WO | WO 2008039263 A2 * | 4/2008 |

\* cited by examiner

|  |  | FS ||
|---|---|---|---|
|  |  | 39 | 53 |
|  |  | LOW | TOP |
| RS | 28 | 1st | 1.39 | 1.89 |
| | 25 | 2nd | 1.56 | 2.12 |
| | 23 | 3rd | 1.70 | 2.30 |
| | 21 | 4th | 1.86 | 2.52 |
| | 19 | 5th | 2.05 | 2.79 |
| | 17 | 6th | 2.29 | 3.12 |
| | 15 | 7th | 2.60 | 3.53 |
| | 14 | 8th | 2.79 | 3.79 |
| | 13 | 9th | 3.00 | 4.08 |
| | 12 | 10th | 3.25 | 4.42 |
| | 11 | 11th | 3.55 | 4.82 |

*FIG. 5*

BICYCLE CONTROL SYSTEM

BACKGROUND OF THE INVENTION

Field of the Invention

The present invention relates to a bicycle control system.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle control system.

SUMMARY OF THE INVENTION

In accordance with a first aspect of the present invention, a bicycle control system comprises a first electrical component and a second electrical component. The first electrical component comprises a first base member, a first movable member, a first actuator, and a first controller. The first base member is configured to be attached to a bicycle body. The first movable member is movable relative to the first base member. The first actuator is configured to move the first movable member relative to the first base member. The first controller is configured to control the first actuator. The second electrical component comprises a second base member, a second movable member, a second actuator, and a second controller. The second base member is configured to be attached to the bicycle body. The second movable member is movable relative to the second base member. The second actuator is configured to move the second movable member relative to the second base member. The second controller is configured to control the second actuator. The first controller and the second controller are configured to wirelessly communicate.

With the bicycle control system in accordance with the first aspect, since the first controller and the second controller are configured to wirelessly communicate, a cable electrically connecting the first electrical component and the second electrical component can be omitted from the bicycle control system.

In accordance with a second aspect of the present invention, the bicycle control system according to the first aspect is configured so that the first controller includes a first wireless receiver and a first wireless transmitter. The second controller includes a second wireless receiver and a second wireless transmitter. The first wireless transmitter is configured to wirelessly transmit a first signal to the second wireless receiver. The second wireless transmitter is configured to wirelessly transmit a second signal to the first wireless receiver.

In accordance with a third aspect of the present invention, the bicycle control system according to the second aspect is configured so that the first controller includes a first actuation driver configured to control the first actuator based on the second signal. The second controller includes a second actuation driver configured to control the second actuator based on the first signal.

In accordance with a fourth aspect of the present invention, the bicycle control system according to the third aspect further comprises an operating device configured to wirelessly transmit a first operating signal, a second operating signal, a third operating signal, and a fourth operating signal to the first controller. The first controller includes a third wireless receiver configured to wirelessly receive the first operating signal, the second operating signal, the third operating signal, and the fourth operating signal from the operating device.

With the bicycle control system in accordance with the fourth aspect, it is possible to operate the first electrical component and the second electrical component via the operating member.

In accordance with a fifth aspect of the present invention, the bicycle control system according to the fourth aspect is configured so that the first wireless transmitter is configured to wirelessly transmit the third operating signal and the fourth operating signal to the second wireless receiver.

With the bicycle control system in accordance with the fifth aspect, it is possible to utilize the first electrical component as an intermediate communication unit for the second electrical component. This simplifies the operating device.

In accordance with a sixth aspect of the present invention, the bicycle control system according to the fifth aspect is configured so that the first actuation driver is configured to control the first actuator based on the second signal, the first operating signal, and the second operating signal. The second actuation driver is configured to control the second actuator based on the first signal, the third operating signal, and the fourth operating signal.

In accordance with a seventh aspect of the present invention, the bicycle control system according to any one of the third to sixth aspects further comprises an operating device configured to wirelessly transmit a first synchro-operating signal and a second synchro-operating signal to the first controller. The first controller includes a third wireless receiver configured to wirelessly receive the first synchro-operating signal and the second synchro-operating signal from the operating device.

With the bicycle control system in accordance with the seventh aspect, it is possible to operate the first electrical component and the second electrical component via the operating member.

In accordance with an eighth aspect of the present invention, the bicycle control system according to the seventh aspect is configured so that the first wireless transmitter is configured to wirelessly transmit the first synchro-operating signal and the second synchro-operating signal to the second wireless receiver.

In accordance with a ninth aspect of the present invention, the bicycle control system according to the eighth aspect is configured so that the first actuation driver is configured to control the first actuator based on the second signal, the first synchro-operating signal, and the second synchro-operating signal. The second actuation driver is configured to control the second actuator based on the first signal, the first synchro-operating signal, and the second synchro-operating signal.

In accordance with a tenth aspect of the present invention, the bicycle control system according to any one of the third to ninth aspects further comprises an operating device configured to wirelessly transmit a first operating signal, a second operating signal, a third operating signal, and a fourth operating signal to the first controller and the second controller. The first controller includes a third wireless receiver configured to wirelessly receive the first operating signal and the second operating signal from the operating device. The second controller includes a fourth wireless receiver configured to wirelessly receive the third operating signal and the fourth operating signal from the operating device.

With the bicycle control system in accordance with the tenth aspect, it is possible to operate the first electrical component and the second electrical component via the operating member.

In accordance with an eleventh aspect of the present invention, the bicycle control system according to the tenth aspect is configured so that the first actuation driver is configured to control the first actuator based on the second signal, the first operating signal, and the second operating signal. The second actuation driver is configured to control the second actuator based on the first signal, the third operating signal, and the fourth operating signal.

In accordance with a twelfth aspect of the present invention, the bicycle control system according to any one of the first to tenth aspects further comprises an intermediate communication device configured to wirelessly communicate with the first controller and the second controller. The first controller and the second controller are configured to wirelessly communicate via the intermediate communication device.

With the bicycle control system in accordance with the twelfth aspect, it is possible to relay command signals for the first electrical component and the second electrical component.

In accordance with a thirteenth aspect of the present invention, the bicycle control system according to the twelfth aspect is configured so that the first controller includes a first wireless receiver and a first wireless transmitter. The second controller includes a second wireless receiver and a second wireless transmitter. The first wireless transmitter is configured to wirelessly transmit a first signal to the second wireless receiver via the intermediate communication device. The second wireless transmitter is configured to wirelessly transmit a second signal to the first wireless receiver via the intermediate communication device.

In accordance with a fourteenth aspect of the present invention, the bicycle control system according to the thirteenth aspect is configured so that the first controller includes a first actuation driver configured to control the second actuator based on the first signal. The second controller includes a second actuation driver configured to control the second actuator based on the first signal.

In accordance with a fifteenth aspect of the present invention, the bicycle control system according to the fourteenth aspect further comprises an operating device configured to output a first operating signal, a second operating signal, a third operating signal, and a fourth operating signal. The intermediate communication device is configured to wirelessly receive the first operating signal, the second operating signal, the third operating signal, and the fourth operating signal from the operating device. The first wireless receiver is configured to wirelessly receive the first operating signal and the second operating signal from the intermediate communication device. The second wireless receiver is configured to wirelessly receive the third operating signal and the fourth operating signal from the intermediate communication device.

With the bicycle control system in accordance with the fifteenth aspect, it is possible to operate the first electrical component and the second electrical component via the operating member.

In accordance with a sixteenth aspect of the present invention, the bicycle control system according to the fifteenth aspect is configured so that the first actuation driver is configured to control the first actuator based on the second signal, the first operating signal, and the second operating signal. The second actuation driver is configured to control the second actuator based on the first signal, the third operating signal, and the fourth operating signal.

In accordance with a seventeenth aspect of the present invention, the bicycle control system according to any one of the twelfth to sixteenth aspects is configured so that the intermediate communication device has a pairing mode in which the intermediate communication device establishes a wireless communication between the intermediate communication device and each of the first controller and the second controller. The first controller has a pairing mode in which the first controller establishes the wireless communication between the first controller and the intermediate communication device. The second controller has a pairing mode in which the second controller establishes the wireless communication between the second controller and the intermediate communication device.

With the bicycle control system in accordance with the seventeenth aspect, it is possible to establish the wireless communication between the intermediate communication device and each of the first controller and the second controller without crosstalk.

In accordance with an eighteenth aspect of the present invention, the bicycle control system according to any one of the first to seventeenth aspects is configured so that the first controller has a pairing mode in which the first controller establishes a wireless communication between the first controller and the second controller. The second controller has a pairing mode in which the second controller establishes the wireless communication between the first controller and the second controller.

With the bicycle control system in accordance with the eighteenth aspect, it is possible to establish the wireless communication between the first controller and the second controller without crosstalk.

In accordance with a nineteenth aspect of the present invention, the bicycle control system according to any one of the first to eighteenth aspects is configured so that the first electrical component comprises a front derailleur configured to shift a bicycle chain between a plurality of front sprockets. The second electrical component comprises a rear derailleur configured to shift the bicycle chain between a plurality of rear sprockets.

In accordance with a twentieth aspect of the present invention, the bicycle control system according to any one of the first to nineteenth aspects is configured so that the first controller and the second controller are configured to wirelessly communicate with each other via one of a one-way communication and a two-way communication.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 shows a shift table of the bicycle control system illustrated in FIG. 1;

DESCRIPTION OF THE EMBODIMENTS

Figure 1:
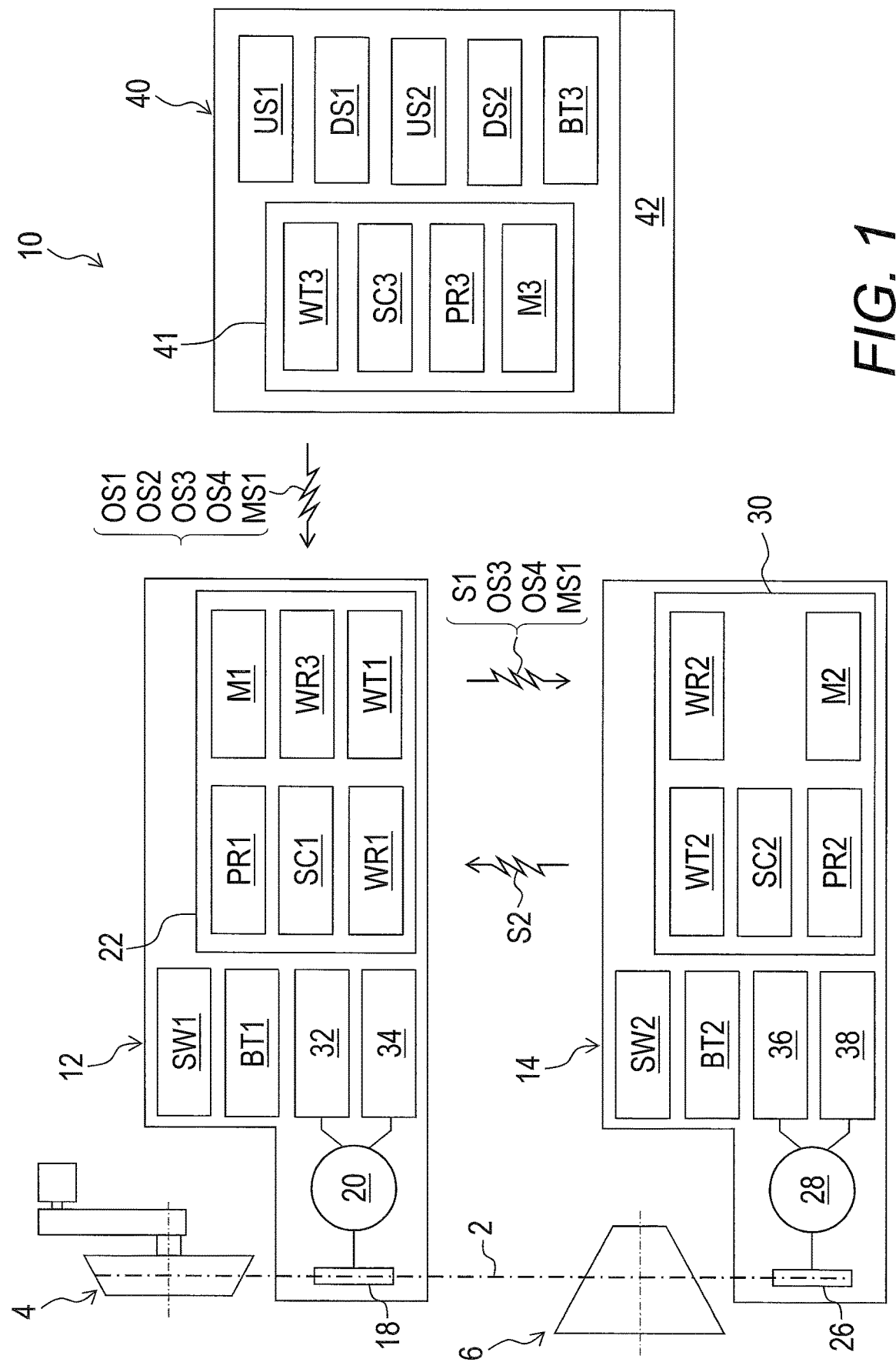
FIG. 1 is a block diagram of a bicycle control system in accordance with a first embodiment (normal mode)

The embodiments will now be described with reference to the accompanying drawings, wherein like reference numerals designate corresponding or identical elements throughout the various drawings.

First Embodiment

Referring initially to FIG. 1, a bicycle control system 10 in accordance with a first embodiment comprises a first electrical component 12 and a second electrical component 14. In this embodiment, the first electrical component 12 comprises a front derailleur (FIG. 2) configured to shift a bicycle chain 2 between a plurality of front sprockets of a front sprocket assembly 4. The second electrical component 14 comprises a rear derailleur (FIG. 3) configured to shift the bicycle chain 2 between a plurality of rear sprockets of a rear sprocket assembly 6. However, the first electrical component 12 can be an electrical component other than the front derailleur, such as a bicycle suspension and a bicycle adjustable seatpost. The second electrical component 14 can be an electrical component other than the rear derailleur, such as a bicycle rear suspension and a bicycle adjustable seatpost.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar (not shown). Accordingly, these terms, as utilized to describe the bicycle control system 10 and/or other components, should be interpreted relative to the bicycle equipped with the bicycle control system 10 and/or other components as used in an upright riding position on a horizontal surface.

Figure 2:
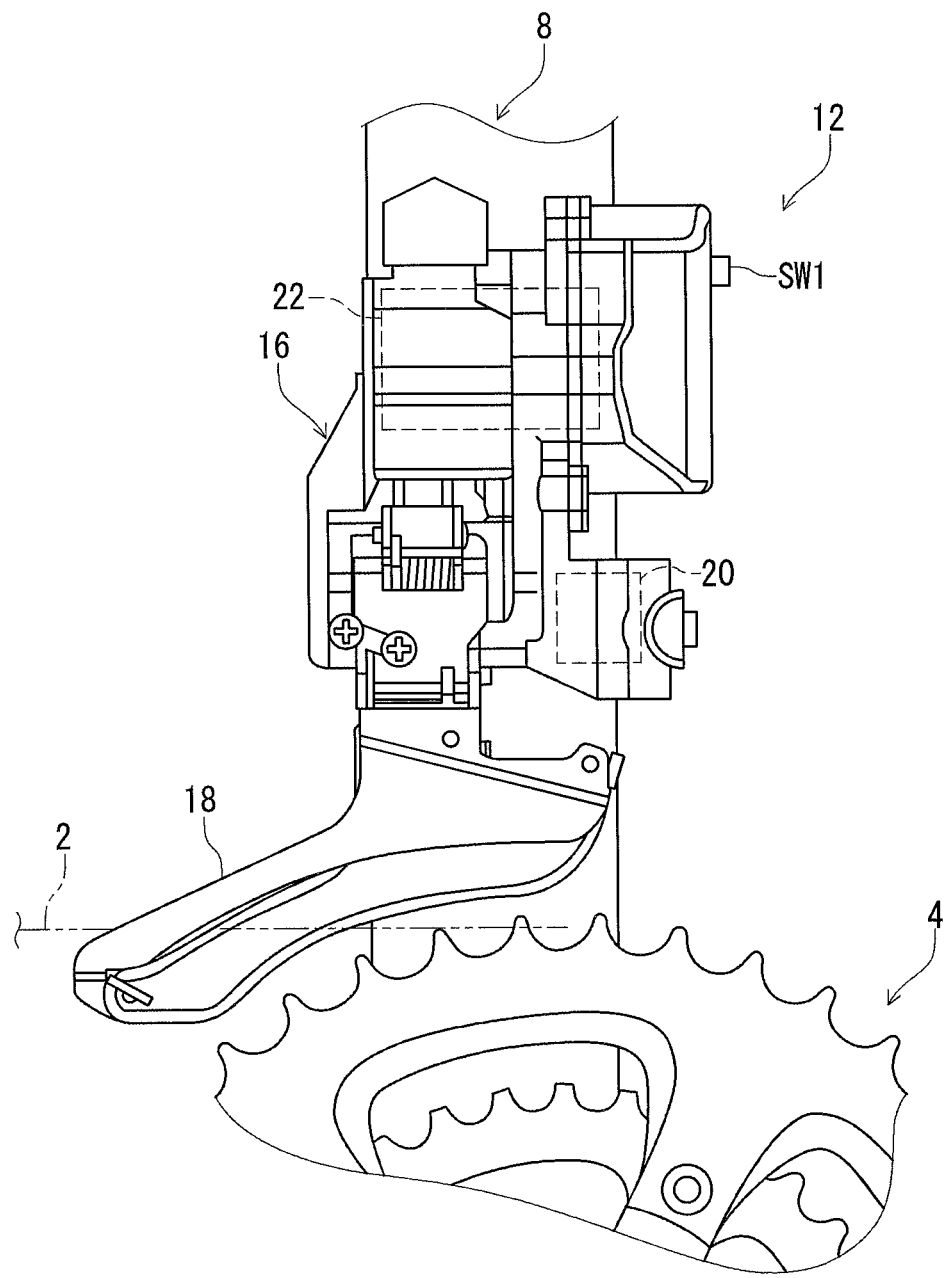
FIG. 2 is an elevational view of a first electrical component of the bicycle control system illustrated in FIG. 1.

As seen in FIGS. 1 and 2, the first electrical component 12 comprises a first base member 16 (FIG. 2), a first movable member 18, a first actuator 20, and a first controller 22. The first base member 16 is configured to be attached to a bicycle body 8 (FIG. 2). The first movable member 18 is movable relative to the first base member 16. The first actuator 20 is configured to move the first movable member 18 relative to the first base member 16. The first controller 22 is configured to control the first actuator 20. As seen in FIG. 2, the first actuator 20 and the first controller 22 are provided in the first base member 16.

In this embodiment, the first movable member 18 is contactable with the bicycle chain 2. The first actuator 20 is configured to move the first movable member 18 to shift the bicycle chain 2 relative to the front sprocket assembly 4. Examples of the first actuator 20 include a direct current motor and a stepper motor.

Figure 3:
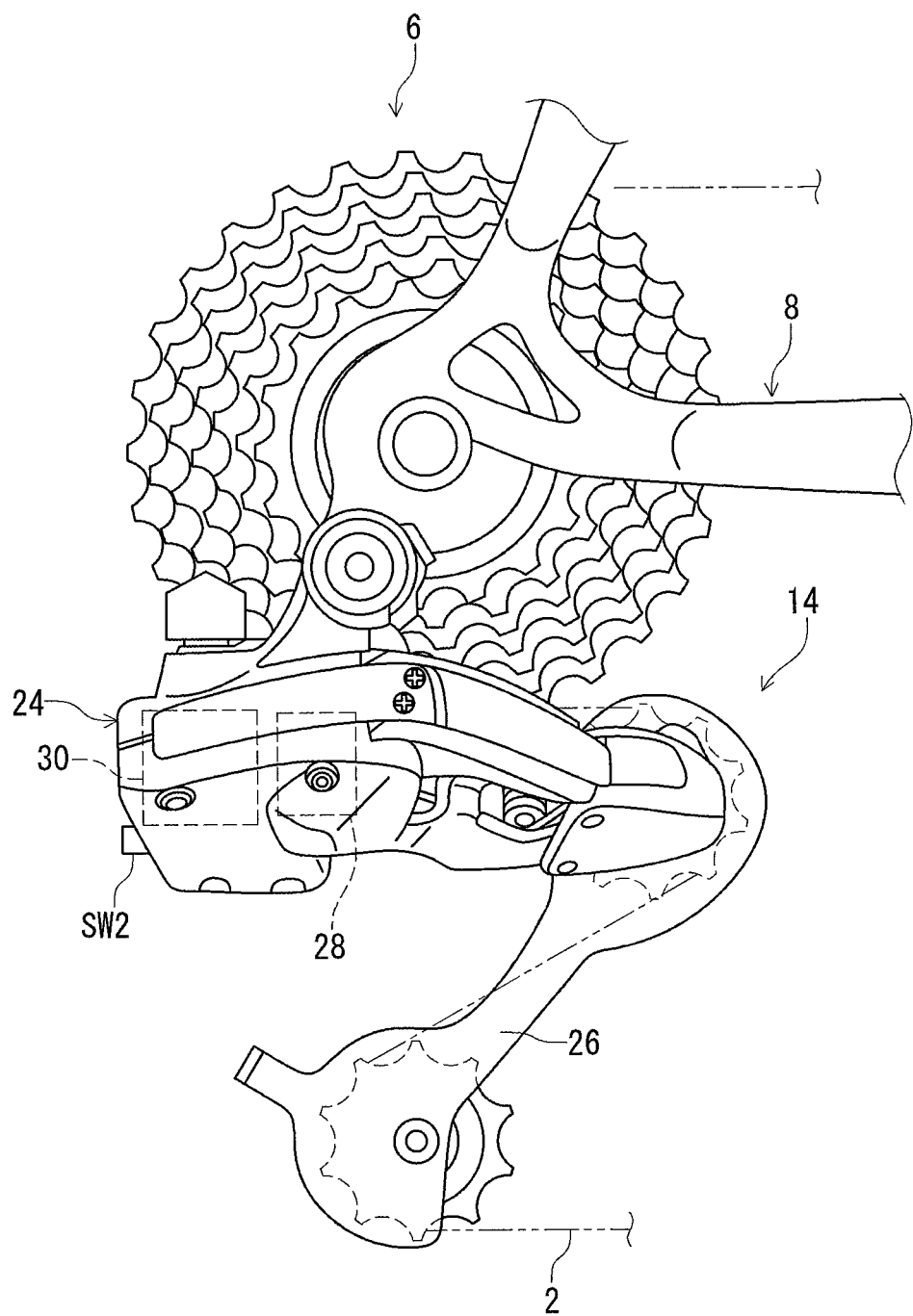
FIG. 3 is an elevational view of a second electrical component of the bicycle control system illustrated in FIG. 1.

As seen in FIGS. 1 and 3, the second electrical component 14 comprises a second base member 24 (FIG. 3), a second movable member 26, a second actuator 28, and a second controller 30. The second base member 24 is configured to be attached to the bicycle body 8 (FIG. 3). The second movable member is movable relative to the second base member 24. The second actuator 28 is configured to move the second movable member 26 relative to the second base member 24. The second controller 30 configured to control the second actuator 28. As seen in FIG. 3, the second actuator 28 and the second controller 30 are provided in the second base member 24. The bicycle body 8 can include a bicycle front fork and a bicycle frame.

In this embodiment, the second movable member 26 is contactable with the bicycle chain 2. The second actuator 28 is configured to move the second movable member 26 to shift the bicycle chain 2 relative to the rear sprocket assembly 6. Examples of the second actuator 28 include a direct current motor and a stepper motor.

As seen in FIG. 1, the first controller 22 and the second controller 30 are configured to wirelessly communicate. The first controller 22 and the second controller 30 are configured to wirelessly communicate with each other via one of a one-way communication and a two-way communication. In this embodiment, the first controller 22 and the second controller 30 are configured to wirelessly communicate with each other via the two-way communication.

As seen in FIG. 1, the first controller 22 includes a first wireless receiver WR1 and a first wireless transmitter WT1. The second controller 30 includes a second wireless receiver WR2 and a second wireless transmitter WT2. The first wireless transmitter WT1 is configured to wirelessly transmit a first signal S1 to the second wireless receiver WR2. The second wireless transmitter WT2 is configured to wirelessly transmit a second signal S2 to the first wireless receiver WR1. The first signal S1 includes first information relating to the first electrical component 12. The second signal S2 includes second information relating to the second electrical component 14.

The first controller 22 includes a first signal controller SC1 configured to control the first wireless receiver WR1 and the first wireless transmitter WT1 based on input signals such as the second signal S2. The second controller 30 includes a second signal controller SC2 configured to control the second wireless receiver WR2 and the second wireless transmitter WT2 based on input signals such as the first signal S1.

The first controller 22 includes a first processor PR1 and a first memory M1. The first processor PR1 includes a central processing unit (CPU). The first memory M1 includes a read only memory (ROM) and a random access memory (RAM). For example, a program stored in the first memory M1 is read into the first processor PR1, and thereby several functions of the first controller 22 are performed. For example, the first controller 22 is programmed to perform functions of the first wireless receiver WR1, the first wireless transmitter WT1, and the first signal controller SC1.

The second controller 30 includes a second processor PR2 and a second memory M2. The second processor PR2 includes a CPU. The second memory M2 includes a ROM and a RAM. For example, a program stored in the second memory M2 is read into the second processor PR2, and thereby several functions of the second controller 30 are performed. For example, the second controller 30 is programmed to perform functions of the second wireless receiver WR2, the second wireless transmitter WT2, and the second signal controller SC2.

As seen in FIG. 1, the first controller 22 includes a first actuation driver 32 and a first position sensor 34. The first actuation driver 32 is configured to control the first actuator 20 based on the second signal S2. The first actuation driver 32 and the first position sensor 34 are electrically connected to the first controller 22. The first position sensor 34 is configured to sense a current position of the first movable member 18 relative to the first base member 16 (FIG. 2) via the first actuator 20 for determining a current gear position of the first electrical component 12. Examples of the first position sensor 34 include a contact rotational position sensor such as a potentiometer, and a non-contact rotational position sensor such as an optical sensor (e.g., a rotary encoder) and a magnetic sensor (e.g., a hall sensor). The current position of the first actuator 20 is stored in the first memory M1.

The second controller 30 includes a second actuation driver 36 and a second position sensor 38. The second actuation driver 36 is configured to control the second actuator 28 based on the first signal S1. The second actuation driver 36 and the second position sensor 38 are electrically connected to the second controller 30. The second position sensor 38 is configured to sense a current position of the second movable member 26 relative to the second base member 24 (FIG. 3) via the second actuator 28 for determining a current gear position of the second electrical component 14. Examples of the second position sensor 38 include a contact rotational position sensor such as a potentiometer, and a non-contact rotational position sensor such as an optical sensor (e.g., a rotary encoder) and a magnetic sensor (e.g., a hall sensor). The current position of the second actuator 28 is stored in the second memory M2.

The first electrical component 12 includes a first battery BT1 configured to supply electric power to the first actuator 20, the first controller 22, the first actuation driver 32, and the first position sensor 34. The first battery BT1 is electrically connected to the first actuator 20, the first controller 22, the first actuation driver 32, and the first position sensor 34.

The second electrical component 14 includes a second battery BT2 configured to supply electric power to the second actuator 28, the second controller 30, the second actuation driver 36, and the second position sensor 38. The second battery BT2 is electrically connected to the second actuator 28, the second controller 30, the second actuation driver 36, and the second position sensor 38. The first battery BT1 and the second battery BT2 can be omitted from the first electrical component 12 and the second electrical component 14, and can be attached to the bicycle body 8 and electrically connected to the first electrical component 12 and the second electrical component 14 via an electrical wire. Additionally, in such case, the second battery BT2 can be integral with the first battery BT1 and provided as one battery.

As seen in FIG. 1, the bicycle control system 10 further comprises an operating device 40. The operating device 40 is configured to wirelessly transmit a first operating signal OS1, a second operating signal OS2, a third operating signal OS3, and a fourth operating signal OS4 to the first controller 22. The operating device 40 is mounted to a handlebar. While the operating device 40 is illustrated as a single device in FIG. 1, the operating device 40 can be separate units.

In this embodiment, the first operating signal OS1 corresponds to an upshifting signal to upshift the first electrical component 12. The second operating signal OS2 corresponds to a downshifting signal to downshift the first electrical component 12. The third operating signal OS3 corresponds to an upshifting signal to upshift the first electrical component 12. The fourth operating signal OS4 corresponds to a downshifting signal to downshift the first electrical component 12.

In the present application, the term "upshift" refers to changing into a higher gear in the bicycle control system 10. The term "downshift" refers to changing into a lower gear in the bicycle control system 10. For example, upshifting occurs when the bicycle chain 2 (FIG. 1) is shifted by the first electrical component 12 from a smaller sprocket to a neighboring larger sprocket in the front sprocket assembly 4. The larger sprocket has a total number of teeth larger than a total number of teeth of the neighboring smaller sprocket. Downshifting occurs when the bicycle chain 2 is shifted by the second electrical component 14 from a small sprocket to a neighboring larger sprocket in the rear sprocket assembly 6. The smaller sprocket has a total number of teeth smaller than a total number of teeth of the neighboring larger sprocket.

The operating device 40 includes a first shift switch US1, a second shift switch DS1, a third shift switch US2, and a fourth shift switch DS2. The first shift switch US1 is configured to generate the first operating signal OS1 in response to an upshift input operation from a user. The second shift switch DS1 is configured to generate the second operating signal OS2 in response to a downshift input operation from the user. The third shift switch US2 is configured to generate the third operating signal OS3 in response to an upshift input operation from the user. The fourth shift switch DS2 is configured to generate the fourth operating signal OS4 in response to a downshift input operation from the user.

The operating device 40 includes an operating controller 41 wirelessly transmit the first to fourth operating signals OS1 to OS4 to the first controller 22. The operating controller 41 includes a third wireless transmitter WT3 and a third signal controller SC3. The third wireless transmitter is configured to wirelessly transmit the first to fourth operating signals OS1 to OS4 to the first controller 22. The third signal controller SC3 is configured to control the third wireless transmitter WT3 based on the first to fourth operating signals OS1 to OS4.

The operating controller 41 includes a third processor PR3 and a third memory M3. The third processor PR3 includes a CPU. The third memory M3 includes a ROM and a RAM. For example, a program stored in the third memory M3 is read into the third processor PR3, and thereby several functions of the operating controller 41 are performed. For example, the operating controller 41 is programmed to perform functions of the third wireless transmitter WT3 and the third signal controller SC3.

The operating device 40 includes a third battery BT3 configured to supply electric power to the first to fourth shift switches US1, DS1, US2 and DS2 and the operating controller 41. The third battery BT3 is electrically connected to the first to fourth shift switches US1, DS1, US2 and DS2 and the operating controller 41. The operating controller 41 is electrically connected to the first to fourth shift switches US1, DS1, US2 and DS2. The third battery BT3 can be omitted from the operating device 40 and can be attached to the handlebar and electrically connected to the operating device 40 via an electrical wire. Alternatively, the third battery BT3 can be omitted from the operating device 40, and the operating device 40 can include a power-generating unit configured to generate electrical power by movement of the first to fourth shift switches US1, DS1, US2 and DS2.

The bicycle control system 10 has a normal mode and a synchro mode. In the normal mode, the first electrical component 12 and the second electrical component 14 are independently controlled based on the shift signals from the operating device 40 without using a transmission route R1

(FIG. 5). In the synchro mode, the first electrical component 12 and the second electrical component 14 are controlled in accordance with the transmission route R1 in response to a single shift signal from the operating device 40. The first controller 22 is configured to store the transmission route R1 in the first memory M1. The second controller 30 is configured to store the transmission route R1 in the second memory M2.

The first controller 22 includes a third wireless receiver WR3. In the normal mode, the third wireless receiver WR3 is configured to wirelessly receive the first operating signal OS1, the second operating signal OS2, the third operating signal OS3, and the fourth operating signal OS4 from the operating device 40 (in this embodiment, from the third wireless transmitter WT3). The first wireless transmitter WT1 is configured to wirelessly transmit the third operating signal OS3 and the fourth operating signal OS4 to the second wireless receiver WR2. The third operating signal OS3 and the fourth operating signal OS4 are transmitted from the operating device 40 to the second controller 30 via the first controller 22. The first wireless receiver WR1 and the third wireless receiver WR3 can be provide as one wireless receiver. The first wireless receiver WR1, the first wireless transmitter WT1, and the third wireless receiver WR3 can be omitted from the first electrical component 12, and can be attached to the bicycle body 8 and electrically connected to the first electrical component 12 via an electrical wire. Alternatively, the second wireless receiver WR2 and the second wireless transmitter WT2 can be omitted from the second electrical component 14 and can be attached to the bicycle body 8 and electrically connected to the second electrical component 14 via an electrical wire.

As seen in FIG. 1, in the normal mode, the first actuation driver 32 is configured to control the first actuator 20 based on the second signal S2, the first operating signal OS1, and the second operating signal OS2. The second actuation driver 36 is configured to control the second actuator 28 based on the first signal S1, the third operating signal OS3, and the fourth operating signal OS4.

Figure 4:
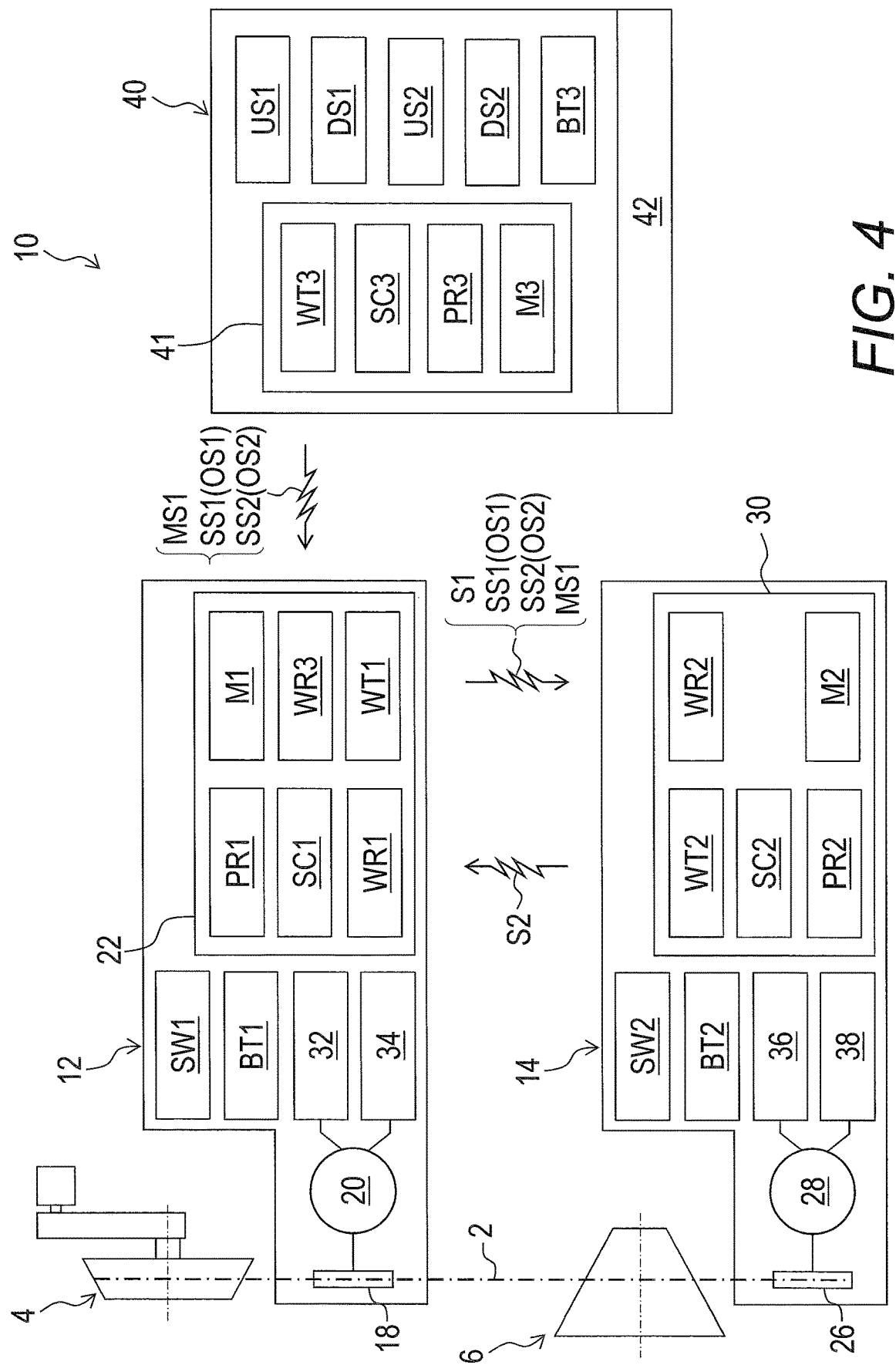
FIG. 4 is a block diagram of the bicycle control system illustrated in FIG. 1 (synchro mode)

As seen in FIG. 4, in the synchro mode, the operating device 40 is configured to wirelessly transmit a first synchro-operating signal SS1 and a second synchro-operating signal SS2 to the first controller 22. The third wireless receiver WR3 is configured to wirelessly receive the first synchro-operating signal SS1 and the second synchro-operating signal SS2 from the operating device 40. The first wireless transmitter WT1 is configured to wirelessly transmit the first synchro-operating signal SS1 and the second synchro-operating signal SS2 to the second wireless receiver WR2. The first synchro-operating signal SS1 and the second synchro-operating signal SS2 are transmitted from the operating device 40 to the second controller 30 via the first controller 22.

In this embodiment, the first synchro-operating signal SS1 corresponds to the first operating signal OS1 and can also be referred to as the first operating signal OS1. The second synchro-operating signal SS2 corresponds to the second operating signal OS2 and can also be referred to as the second operating signal OS2. The third operating signal OS3 and the fourth operating signal OS4 are not used for changing gears in the synchro mode. However, the first synchro-operating signal SS1 can correspond to one of the third operating signal OS3 and the fourth operating signal OS4. The second synchro-operating signal SS2 can correspond to the other of the third operating signal OS3 and the fourth operating signal OS4.

The operating device 40 can be omitted from the bicycle control system 10 if needed and/or desired. For example, the first controller 22 and the second controller 30 can be configured to automatically control the first electrical component 12 and the second electrical component 14 without input signals such as the first to fourth operating signals OS1 to OS4.

At least one of the first to fourth shift switches US1, DS1, US2, and DS2 can be omitted from the operating device 40. For example, the third shift switch US2 and the fourth shift switch DS2 can be omitted from the operating device 40 in a case where the bicycle control system 10 has only the synchro mode.

FIG. 5 shows a shift table including gear ratios, a total number of teeth of each front sprocket of the front sprocket assembly 4 ("FS"), and a total number of teeth of each rear sprocket of the rear sprocket assembly 6 ("RS"). The first controller 22 of the first electrical component 12 is configured to store the shift table for the bicycle control system 10. In this embodiment, the first electrical component 12 has low and top gears as the gear position. The second electrical component 14 has first to eleventh gears as the gear position.

The transmission route R1 includes synchro-shift points which are each circled with a single circle. In this embodiment, the first controller 22 and the second controller 30 respectively synchronously control the first actuator 20 and the second actuator 28 via the first actuation driver 32 and the second actuation driver 36 to change gears at the gear positions corresponding to the synchro-shift point in response to a single shift signal such as the first synchro-operating signal or the second synchro-operating signal.

In this embodiment, the transmission route R1 is used for both upshifting and downshifting. However, each of the first controller and the second controller can be configured to store an upshift route for upshifting and a downshift route, which is different from the upshift route, for downshifting.

As seen in FIG. 5, in the transmission route R1, first to seventh gears of the first electrical component 12 are used for low gear of the second electrical component 14. Sixth to eleventh gears of the first electrical component 12 are used for top gear of the second electrical component 14. Namely, thirteen gear positions on the transmission route R1 can be used in the synchro mode.

As seen in FIG. 4, in the synchro mode, the first actuation driver 32 is configured to control the first actuator 20 based on the second signal S2, the first synchro-operating signal SS1, and the second synchro-operating signal SS2. The second actuation driver 36 is configured to control the second actuator 28 based on the first signal S1, the first synchro-operating signal SS1, and the second synchro-operating signal SS2. Specifically, the first controller 22 is configured to wirelessly transmit, as the first signal S1, the current gear position of the first electrical component 12 to the second controller 30. The second controller 30 is configured to wirelessly transmit, as the second signal S2, the current gear position of the second electrical component 14 to the first controller 22.

The first controller 22 can be configured to wirelessly transmit, as the first signal S1, a completion signal indicative of completion of shifting the bicycle chain 2 to the second controller 30. The second controller 30 can be configured to wirelessly transmit, as the second signal S2, a completion signal indicative of completion of shifting the bicycle chain 2 to the first controller 22.

As seen in FIG. 1, the bicycle control system 10 further comprises a mode selector 42 configured to allow the user to select a shifting mode among the normal mode and the synchro mode. Each of the first controller 22 and the second controller 30 is configured to set the shifting mode selected via the mode selector 42. For example, the mode selector 42 is mounted to the operating device 40 and electrically connected to the operating controller 41. The operating controller 41 is configured to wirelessly transmit a mode signal MS1 generated in the mode selector 42 to the first controller 22. The first controller 22 is configured to wirelessly transmit the mode signal MS1 to the second controller 30. The first controller 22 switches the first electrical component 12 between the normal mode and the synchro mode based on the mode signal MS1. The second controller 30 switches the second electrical component 14 between the normal mode and the synchro mode based on the mode signal MS1.

While the bicycle control system 10 has the normal mode and the synchro mode, one of the normal mode and the synchro mode can be omitted from the bicycle control system 10 if needed and/or desired. In such an embodiment, the mode selector 42 can be omitted from the bicycle control system 10.

In the normal mode, for example, the first controller 22 is configured to control the first actuator 20 via the first actuation controller 32 to upshift in response to the first operating signal OS1 regardless of the transmission route R1. The first controller 22 is configured to control the first actuator 20 via the first actuation controller 32 to downshift in response to the second operating signal OS2 regardless of the transmission route R1. The second controller 30 is configured to control the second actuator 28 via the second actuation driver 36 to upshift in response to the third operating signal OS3 regardless of the transmission route R1. The second controller 30 is configured to control the second actuator 28 via the second actuation driver 36 to downshift in response to the fourth operating signal OS4 regardless of the transmission route R1. Namely, it is possible to use twenty two gear positions in the bicycle control system 10.

In the synchro mode, the first controller 22 is configured to control the first actuator 20 via the first actuation driver 32 in accordance with the transmission route R1 in response to the first and second synchro-operating signals SS1 and SS2 (in this embodiment, the first and second operating signals OS1 and OS2). The second controller 30 is configured to control the second actuator 28 via the second actuation driver 36 in accordance with the transmission route R1 in response to the first and second synchro-operating signals SS1 and SS2 (in this embodiment, the first and second operating signals OS1 and OS2).

Furthermore, the first electrical component 12 is configured to adjust an initial position of the first movable member 18 based on the current gear position of the second electrical component 14. Specifically, the second controller 30 is configured to wirelessly transmit, as the second signal S2, a current gear position of the second electrical component 14 to the first controller 22. The second signal controller SC2 is configured to calculate the current gear position of the second electrical component 14 based on the current position of the second movable member 26.

The first signal controller SC1 is configured to calculate a preferable initial position of the first movable member 18 to avoid interference between the first movable member 18 and the bicycle chain 2. The first controller 22 is configured to control the first actuator 20 via the first actuation driver 32 so that the first movable member 18 is positioned at the preferable initial position. When the second electrical component 14 changes the current gear position based on the operating signals, the second controller 30 wirelessly transmits the new current gear position to the first controller 22.

The first controller 22 controls the first actuator 20 via the first actuation driver 32 to change the initial position to the preferable initial position after the first electrical component 12 and the second electrical component 14 complete changing gears. This can prevent the interference between the first movable member 18 and the bicycle chain 2 when the first movable member 18 is positioned at the initial position.

The first controller 22 has a pairing mode in which the first controller 22 establishes a wireless communication between the first controller 22 and the second controller 30. The second controller 30 has a pairing mode in which the second controller 30 establishes the wireless communication between the first controller 22 and the second controller 30.

As seen in FIGS. 1 and 2, the first electrical component 12 includes a first pairing mode switch SW1 configured to bring the first controller 22 into a pairing mode in response to a mode switching operation from the user. The first pairing mode switch SW1 is configured to receive the mode switching operation from the user to bring the first controller 22 into the pairing mode. The first controller 22 enters the pairing mode when the first pairing mode switch SW1 is operated by the user.

Similarly, as seen in FIGS. 1 and 3, the second electrical component 14 includes a second pairing mode switch SW2 configured to bring the second controller 30 into a pairing mode in response to a mode switching operation from the user. The second pairing mode switch SW2 is configured to receive the mode switching operation from the user to bring the second controller 30 into the pairing mode. The second controller 30 enters the pairing mode when the second pairing mode switch SW2 is operated by the user.

In the pairing mode of the first electrical component 12, the first controller 22 identifies the second electrical component 14 based on the pairing demand signal received by the first wireless receiver WR1. In the pairing mode of the first electrical component 12, the first controller 22 controls the first wireless receiver WR1 to scan wireless signals on specific channels. The first signal controller SC1 controls the first wireless transmitter WT1 to repeatedly transmit a wireless signal indicating the identifying information of the second electrical component 14 during the pairing mode.

The first wireless receiver WR1 receives the wireless signal indicating the identifying information of the second electrical component 14. The first controller 22 is configured to store reference ID data and reference signal patterns corresponding to the reference ID data in the first memory M1. The reference ID data indicate device IDs of the operating device 40 which are configured to establish a wireless communication with the first electrical component 12.

The first controller 22 is configured to compare the identifying information of the operating device 40 with the reference ID data. The first controller 22 is configured to determine, among the reference signal patterns, a target signal pattern corresponding to the identifying information received by the first wireless receiver WR1. The first controller 22 is configured to temporarily store the identifying information of the operating device 40 and the determined target signal pattern in the first memory M1.

The first controller 22 is configured to interpret, using the target signal pattern, the wireless signals transmitted from the first wireless transmitter WT1 as separate signals from wireless signals transmitted from other devices. Thus, the first controller 22 establishes the wireless communication with the second controller 30. In this embodiment, the pairing mode is finished in the first electrical component 12 when the first pairing mode switch SW1 is operated in the pairing mode.

Similarly, in the pairing mode of the second electrical component 14, the second controller 30 identifies the first electrical component 12 based on the pairing demand signal received by the second wireless receiver WR2. In the pairing mode of the second electrical component 14, the second controller 30 controls the second wireless receiver WR2 to scan wireless signals on specific channels. The second signal controller SC2 controls the second wireless transmitter WT2 to repeatedly transmit a wireless signal indicating the identifying information of the first electrical component 12 during the pairing mode.

The second wireless receiver WR2 receives the wireless signal indicating the identifying information of the first electrical component 12. The second controller 30 is configured to store reference ID data and reference signal patterns corresponding to the reference ID data in the second memory M2. The reference ID data indicate device IDs of the operating device 40 which are configured to establish a wireless communication with the second electrical component 14.

The second controller 30 is configured to compare the identifying information of the operating device 40 with the reference ID data. The second controller 30 is configured to determine, among the reference signal patterns, a target signal pattern corresponding to the identifying information received by the second wireless receiver WR2. The second controller 30 is configured to temporarily store the identifying information of the operating device 40 and the determined target signal pattern in the second memory M2.

The second controller 30 is configured to interpret, using the target signal pattern, the wireless signals transmitted from the second wireless transmitter WT2 as separate signals from wireless signals transmitted from other devices. Thus, the second controller 30 establishes the wireless communication with the first controller 22. In this embodiment, the pairing mode is finished in the second electrical component 14 when the first pairing mode switch SW1 is operated in the pairing mode.

While the above operations in the pairing mode between the first electrical component 12 and the second electrical component 14 is applied to the pairing mode between the operating device 40 and each of the first electrical component 12 and the second electrical component 14, they will not be described in detail here for the sake of brevity.

In this embodiment, the first controller 22 and the second controller 30 are configured to wirelessly communicate with each other via the two-way communication. However, the first controller 22 and the second controller 30 can be configured to wirelessly communicate with each other via the one-way communication. For example, in a case where the bicycle control system 10 has the synchro mode, the first controller 22 and the second controller 30 are preferably configured to wirelessly communicate with each other via the one-way communication. In a case where the bicycle control system 10 does not has the synchro mode and have the adjusting function for the first movable member 18, the first controller 22 and the second controller 30 can be configured to wirelessly communicate with each other via the one-way communication.

With the bicycle control system 10, it is possible to obtain the following advantageous effects.

(1) With the bicycle control system 10, since the first controller 22 and the second controller 30 are configured to wirelessly communicate, a cable electrically connecting the first electrical component 12 and the second electrical component 14 can be omitted from the bicycle control system 10.

(2) Since the bicycle control system 10 comprises the operating device 40, it is possible to operate the first electrical component 12 and the second electrical component 14 via the operating member.

(3) The first wireless transmitter WT1 is configured to wirelessly transmit the third operating signal OS3 and the fourth operating signal OS4 to the second wireless receiver WR2. Accordingly, it is possible to utilize the first electrical component 12 as an intermediate repeater for the second electrical component 14. This can simplify the bicycle control system 10.

(4) Since each of the first controller 22 and the second controller 30 have the pairing mode, it is possible to establish the wireless communication between the first controller 22 and the second controller 30 without crosstalk.

Second Embodiment

A bicycle control system 210 in accordance with a second embodiment will be described below referring to FIGS. 6 and 7. The bicycle control system 210 has the same configuration as the bicycle control system 10 except for the second controller 30 and the operating controller 241. Thus, elements having substantially the same function as those in the first embodiment will be numbered the same here, and will not be described and/or illustrated again in detail here for the sake of brevity.

Figure 6:
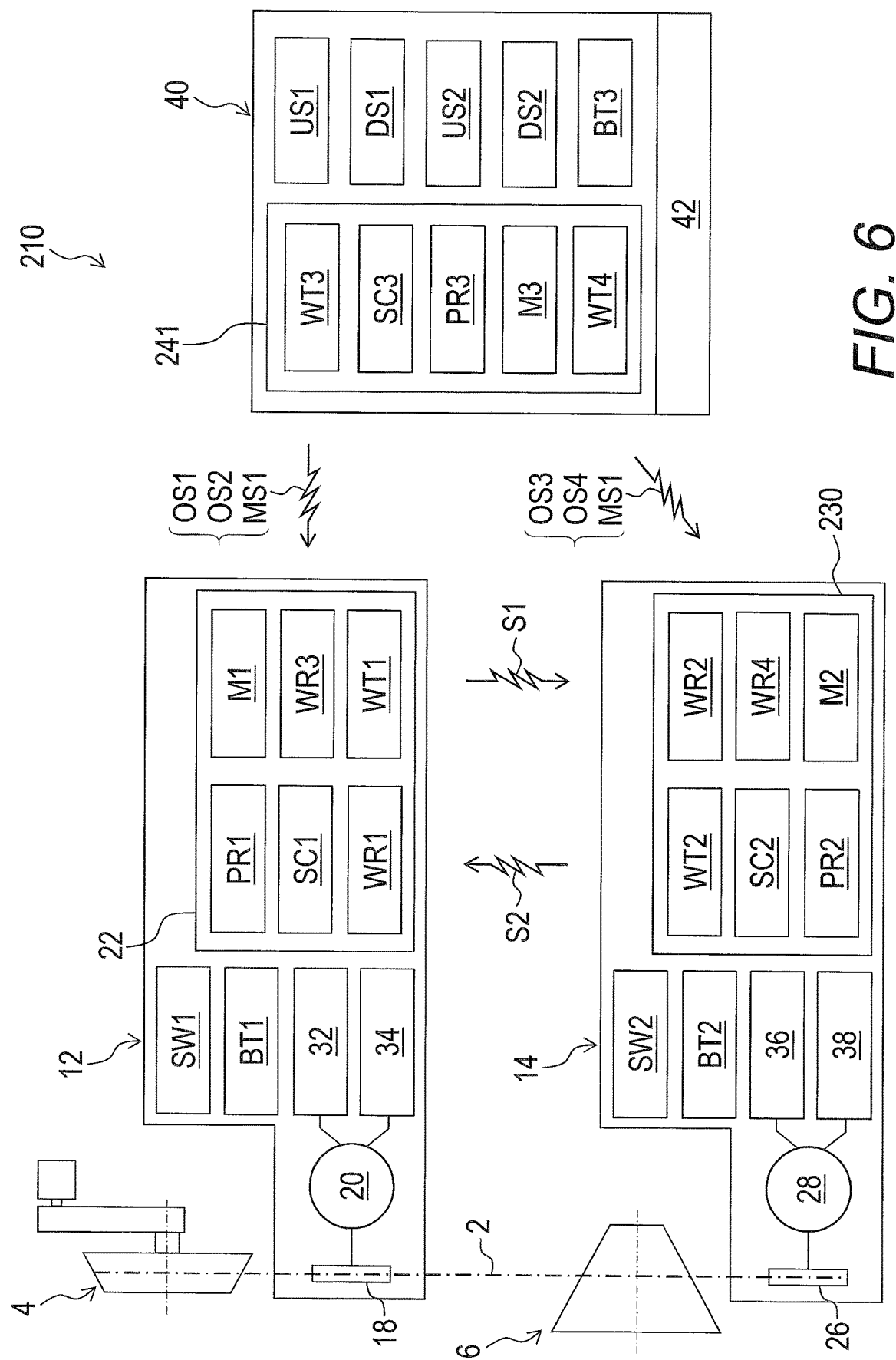
FIG. 6 is a block diagram of a bicycle control system in accordance with a second embodiment (normal mode)

As seen in FIG. 6, in the bicycle control system 210, the second electrical component 14 comprises a second controller 230. The second controller 230 has substantially the same configuration as that of the second controller 30 in the first embodiment. Unlike the second controller 30, however, the second controller 230 includes a fourth wireless receiver WR4 configured to wirelessly receive the third operating signal OS3 and the fourth operating signal OS4 from the operating device 40. The second wireless receiver WR2 and the fourth wireless receiver WR4 can be provide as one wireless receiver.

In this embodiment, the second controller 230 is configured to wirelessly receive the third operating signal OS3 and the fourth operating signal OS4 from the operating device 240 without via the first controller 22. The operating device 40 includes an operating controller 241. The operating controller 241 has substantially the same configuration as that of the operating controller 41 in the first embodiment. Unlike the operating controller 41, the operating controller 241 includes a fourth wireless transmitter WT4 configured to wirelessly transmit the third operating signal OS3 and the fourth operating signal OS4 to the fourth wireless receiver WR4 of the second controller 230. The mode signal MS1 is transmitted from the fourth wireless transmitter WT4 to the fourth wireless receiver WR4.

Figure 7:
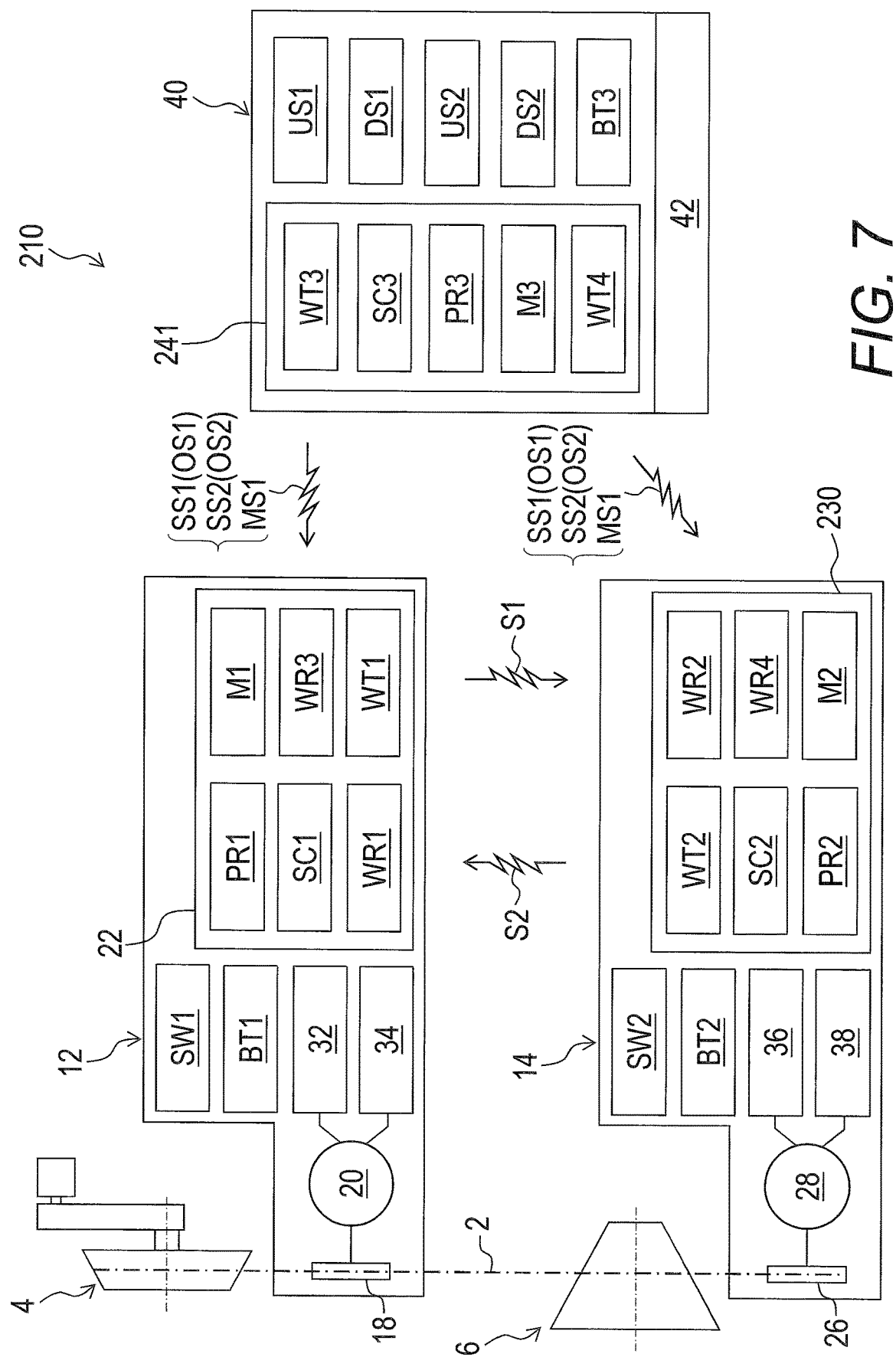
FIG. 7 is a block diagram of the bicycle control system illustrated in FIG. 6 (synchro mode)

As seen in FIG. 7, in the synchro mode, the fourth wireless receiver WR4 is configured to wirelessly receive the first synchro-operating signal SS1 (in this embodiment, the first operating signal OS1) and the second synchro-operating signal SS2 (in this embodiment, the second operating signal OS2) from the fourth wireless transmitter WT4 of the operating device 40.

With the bicycle control system 210, it is possible to obtain substantially the same advantageous effects as those of the bicycle control system 10 in accordance with the first embodiment.

Third Embodiment

A bicycle control system 310 in accordance with a third embodiment will be described below referring to FIGS. 8 and 9. The bicycle control system 310 has the same configuration as the bicycle control system 10 except for an intermediate communication device. Thus, elements having substantially the same function as those in the above embodiments will be numbered the same here, and will not be described and/or illustrated again in detail here for the sake of brevity.

Figure 8:
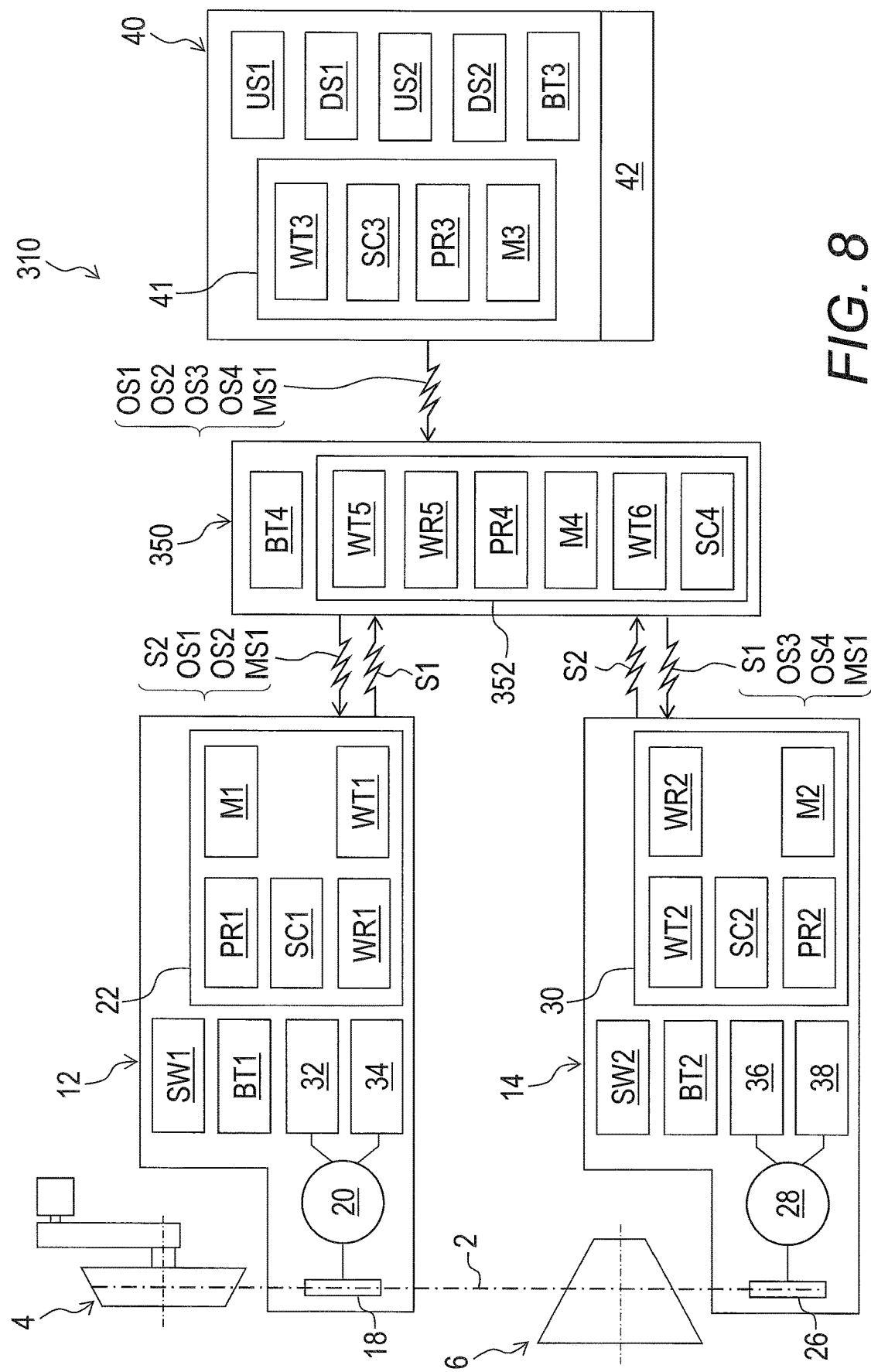
FIG. 8 is a block diagram of a bicycle control system in accordance with a third embodiment (normal mode)

As seen in FIG. 8, the bicycle control system 310 further comprises an intermediate communication device 350 configured to wirelessly communicate with the first controller 22 and the second controller 30. The first controller 22 and the second controller 30 are configured to wirelessly communicate via the intermediate communication device 350. In this embodiment, the first wireless transmitter WT1 is configured to wirelessly transmit the first signal S1 to the second wireless receiver WR2 via the intermediate communication device 350. The second wireless transmitter WT2 is configured to wirelessly transmit the second signal S2 to the first wireless receiver WR1 via the intermediate communication device 350.

The intermediate communication device 350 is configured to wirelessly receive the first operating signal OS1, the second operating signal OS2, the third operating signal OS3, and the fourth operating signal OS4 from the operating device 40. The first wireless receiver WR1 is configured to wirelessly receive the first operating signal OS1 and the second operating signal OS2 from the intermediate communication device 350. The second wireless receiver WR2 is configured to wirelessly receive the third operating signal OS3 and the fourth operating signal OS4 from the intermediate communication device 350. The third wireless receiver WR3 is omitted from the first controller 22.

As seen in FIG. 8, in this embodiment, the intermediate communication device 350 includes a third controller 352 configured to wirelessly communicate with the first electrical component 12, the second electrical component 14, and the operating device 40. The third controller 352 includes a fifth wireless receiver WR5, a fifth wireless transmitter WT5, a sixth wireless transmitter WT6, and a fourth signal controller SC4. The fourth signal controller SC4 is configured to control the fifth wireless receiver WR5, the fifth wireless transmitter WT5, and the sixth wireless transmitter WT6 based on input signals from the first electrical component 12, the second electrical component 14, and the operating device 40.

The intermediate communication device 350 includes a fourth battery BT4 configured to supply electric power to the third controller 352. The fourth battery BT4 is electrically connected to the third controller 352. The intermediate communication device 350 can be mounted on the bicycle body 8. The fourth battery BT4 can be omitted from the intermediate communication device 350, and can be attached to the bicycle body 8 and electrically connected to the intermediate communication device 350 via an electrical wire.

As seen in FIG. 8, in the normal mode, the fifth wireless receiver WR5 is configured to wirelessly receive the first to fourth operating signals OS1 to OS4 from the third wireless transmitter WT3 of the operating device 40. The fifth wireless transmitter WT5 is configured to wirelessly transmit the first operating signal OS1 and the second operating signal OS2 to the first wireless receiver WR1. The sixth wireless transmitter WT6 is configured to wirelessly transmit the third operating signal OS3 and the fourth operating signal OS4 to the second wireless receiver WR2. The fifth wireless transmitter WT5 and the sixth wireless transmitter WT6 are controlled by the fourth signal controller SC4.

In the normal mode, the first actuation driver 32 is configured to control the first actuator based on the second signal S2, the first operating signal OS1, and the second operating signal OS2. The second actuation driver 36 is configured to control the second actuator 28 based on the first signal S1, the third operating signal OS3, and the fourth operating signal OS4.

Figure 9:
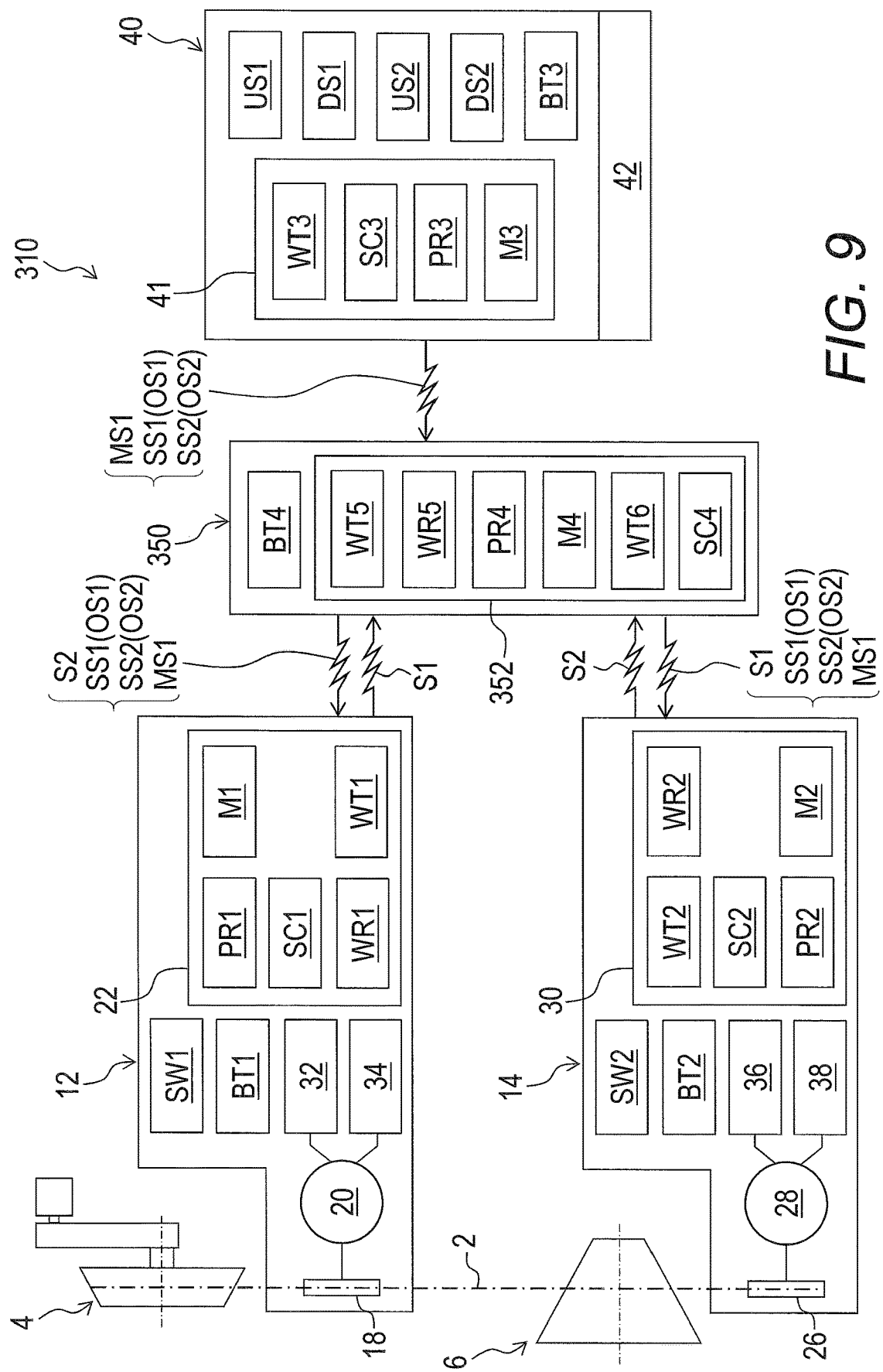
FIG. 9 is a block diagram of the bicycle control system illustrated in FIG. 8 (synchro mode).

As seen in FIG. 9, in the synchro mode, the fifth wireless receiver WR5 is configured to wirelessly receive the first synchro-operating signal SS1 (in this embodiment, the first operating signal OS1) and the second synchro-operating signal SS2 (in this embodiment, the second operating signal OS2) from the third wireless transmitter WT3. The fifth wireless transmitter WT5 is configured to wirelessly transmit the first synchro-operating signal SS1 and the second synchro-operating signal SS2 to the first wireless receiver WR1. The sixth wireless transmitter WT6 is configured to wirelessly transmit the first synchro-operating signal SS1 and the second synchro-operating signal SS2 to the second wireless receiver WR2.

In the synchro mode, the first actuation driver 32 is configured to control the first actuator 20 based on the second signal S2, the first synchro-operating signal SS1, and the second synchro-operating signal SS2. The second actuation driver 36 is configured to control the second actuator 28 based on the first signal S1, the first synchro-operating signal SS1, and the second synchro-operating signal SS2.

As seen in FIG. 8, the intermediate communication device 350 includes a fourth processor PR4 and a fourth memory M4. The fourth processor PR4 includes a CPU. The fourth memory M4 includes a ROM and a RAM. For example, a program stored in the fourth memory M4 is read into the fourth processor PR4, and thereby several functions of the fourth controller 352 are performed. For example, the fourth controller 352 is programmed to perform functions of the fifth wireless receiver WR5, the fifth wireless transmitter WT5, the sixth wireless transmitter WT6, and the fourth signal controller SC4.

The intermediate communication device 350 has a pairing mode in which the intermediate communication device 350 establishes a wireless communication between the intermediate communication device 350 and each of the first controller 22 and the second controller 30. The first controller 22 has a pairing mode in which the first controller 22 establishes the wireless communication between the first controller 22 and the intermediate communication device 350. The second controller 30 has a pairing mode in which the second controller 30 establishes the wireless communication between the second controller 30 and the intermediate communication device 350.

The pairing mode of the intermediate communication device 350, the first controller 22, and the second controller 30 is substantially the same as that of each of the first controller 22 and the second controller 30. Thus, it will not be described in detail here for the sake of brevity.

With the bicycle control system 310, it is possible to obtain substantially the same advantageous effects as those of the bicycle control system 10 in accordance with the first embodiment.

It will be apparent to those skilled in the bicycle field from the present disclosure that the constructions of the above embodiments can be at least partially combined with each other.

It will be apparent to those skilled in the bicycle field from the present disclosure that the above embodiments can be at least partially combined with each other.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle control system comprising:
    a first electrical shifting device comprising:
        a first base member configured to be attached to a bicycle body;
        a first movable member movable relative to the first base member;
        a first actuator configured to move the first movable member relative to the first base member for changing a gear ratio of a bicycle; and
        a first controller including a first processor configured to control the first actuator and a first memory storing a transmission route including at least one synchro-shift points;
    a second electrical shifting device comprising:
        a second base member configured to be attached to the bicycle body;
        a second movable member movable relative to the second base member;
        a second actuator configured to move the second movable member relative to the second base member for changing the gear ratio of the bicycle; and
        a second controller including a second processor configured to control the second actuator; and
    an operating device having a wireless transmitter, wherein the bicycle control system has a normal mode and a synchro mode such that:
        in the normal mode, the first electrical shifting device and the second electrical shifting device are independently controlled based on shift signals from the operating device without using the transmission route; and
        in the synchro mode, the first electrical shifting device and the second electrical shifting device are synchronously controlled in accordance with the transmission route in response to a single shift signal from the operating device, the single shift signal being a synchro-operating signal, the transmission route including the least one synchro-shift points at which the first controller and the second controller respectively synchronously control the first actuator and the second actuator to change gears at gear positions corresponding to the at least one synchro-shift points in response to the synchro-operating signal, and
    the operating device, the first electrical shifting device, and the second electrical shifting device are all attached to the same bicycle body.

2. The bicycle control system according to claim 1, wherein
    the first controller is configured to wirelessly receive the synchro-operating signal from the operating device, and
    the first controller is configured to wirelessly transmit the synchro-operating signal to the second controller.

3. The bicycle control system according to claim 1, wherein
    the first electrical shifting device comprises a front derailleur configured to shift a bicycle chain between a plurality of front sprockets,
    the second electrical shifting device comprises a rear derailleur configured to shift the bicycle chain between a plurality of rear sprockets.

4. The bicycle control system according to claim 1, wherein
    the first controller and the second controller are configured to wirelessly communicate with each other via one of a one-way communication and a two-way communication.

5. The bicycle control system according to claim 1, wherein
    the first actuator includes a first motor, and
    the second actuator includes a second motor.

6. The bicycle control system according to claim 1, further comprising:
    an intermediate communication device configured to wirelessly communicate with the first controller and the second controller, wherein
    the first controller and the second controller are configured to wirelessly communicate via the intermediate communication device.

7. The bicycle control system according to claim 6, wherein
    the intermediate communication device has a pairing mode in which the intermediate communication device establishes a wireless communication between the intermediate communication device and each of the first controller and the second controller, the first controller has a pairing mode in which the first controller establishes the wireless communication between the first controller and the intermediate communication device, and the second controller has a pairing mode in which the second controller establishes the wireless communication between the second controller and the intermediate communication device.

8. The bicycle control system according to claim 6, wherein the first controller has a pairing mode in which the first controller establishes a wireless communication between the first controller and the second controller, and the second controller has a pairing mode in which the second controller establishes the wireless communication between the first controller and the second controller.

9. The bicycle control system according to claim 1, wherein the first controller includes a first wireless receiver and a first wireless transmitter, and the second controller includes a second wireless receiver and a second wireless transmitter.

10. The bicycle control system according to claim 1, wherein the second controller includes a second memory storing the transmission route including the at least one synchro-shift points.

11. The bicycle control system according to claim 4, wherein the first controller and the second controller are configured to wirelessly and directly communicate with each other.

12. The bicycle control system according to claim 8, wherein the first electrical shifting device has a first pairing mode switch configured to bring the first controller into the pairing mode in response to input of a user, and the second electrical shifting device has a second pairing mode switch configured to bring the second controller into the pairing mode in response to input of the user.

* * * * *